(12) United States Patent
Nivet

(10) Patent No.: US 7,911,163 B2
(45) Date of Patent: Mar. 22, 2011

(54) METHOD AND DEVICE FOR CONTROLLING A SEAT

(75) Inventor: Laurent Nivet, Gif sur Yvette (FR)

(73) Assignee: Precilec, Auxerre (FR)

( * ) Notice: Subject to any disclaimer, the term of this patent is extended or adjusted under 35 U.S.C. 154(b) by 320 days.

(21) Appl. No.: 12/033,328

(22) Filed: Feb. 19, 2008

(65) Prior Publication Data

US 2008/0197677 A1   Aug. 21, 2008

(30) Foreign Application Priority Data

Feb. 16, 2007   (FR) .................................... 07 53309

(51) Int. Cl.
*H02P 3/00*   (2006.01)
*G05D 3/00*   (2006.01)
(52) U.S. Cl. ......... 318/266; 318/268; 318/286; 318/466
(58) Field of Classification Search .................. 318/260, 318/266, 280, 283, 466, 474, 268, 286, 34, 318/445, 603; 177/144; 180/273; 280/735; 296/65.01; 297/330, 341
See application file for complete search history.

(56) References Cited

U.S. PATENT DOCUMENTS

| | | | |
|---|---|---|---|
| 6,940,026 B2 * | 9/2005 | Rundell et al. | 177/144 |
| 7,138,779 B2 * | 11/2006 | Robert | 318/466 |
| 7,233,852 B2 * | 6/2007 | Murphy et al. | 701/45 |
| 2003/0080699 A1 * | 5/2003 | Rumney | 318/9 |
| 2005/0088129 A1 * | 4/2005 | Robert | 318/466 |
| 2006/0138797 A1 * | 6/2006 | Wang et al. | 296/68.1 |
| 2006/0253238 A1 * | 11/2006 | Murphy et al. | 701/45 |
| 2008/0009989 A1 * | 1/2008 | Kim et al. | 701/36 |
| 2009/0002184 A1 * | 1/2009 | Lenneman et al. | 340/665 |

* cited by examiner

*Primary Examiner* — Paul Ip
(74) *Attorney, Agent, or Firm* — Kening Li; Pinsent Masons LLP

(57) ABSTRACT

The seat which is provided with at least two elements which can be moved relative to each other and an actuator for maneuvering a movable element, a unit for controlling the actuator for the movement of the movable element comprises:
  means for measuring a force ($C_u$) applied manually to the movable element by a user,
the control unit comprises:
  means for calculating the theoretical force ($C_{th}$) which must be applied by the actuator to the movable element in the direction of the force ($C_u$) applied manually to the movable element by the user; and
  means for controlling the actuator for the movement of the movable element in accordance with the theoretical force ($C_{th}$).

20 Claims, 2 Drawing Sheets

METHOD AND DEVICE FOR CONTROLLING A SEAT

TECHNICAL FIELD

The present invention relates to a method for controlling a seat which is provided with an actuator for maneuvering a movable element of the seat.

BACKGROUND TO THE INVENTION

Currently, seats, in particular aircraft seats, are provided with electrical actuators which allow the elements of the seat to be moved relative to each other.

Actuators are generally provided with potentiometers which allow the relative position to be determined for the elements which are controlled by the actuator in accordance with the state of the actuator.

During the installation of the seat, it is necessary to calibrate each actuator and in particular the potentiometer with which the actuator is provided. To this end, the seat elements controlled by the actuator are moved between their two extreme positions and the corresponding values recorded by the potentiometer of the actuator are stored.

The operator responsible for this calibration operation must therefore manually move the seat element between the two extreme positions thereof. To this end, he either uses the actuator by controlling it from the appropriate keypad, or manually moves the seat element by applying a force greater than the retention force applied by the actuator which is not supplied with power.

In practice, the movement of the seat element is made complex for the operator either by the fact that he is not close to the keypad or by the fact that it is necessary to apply a very significant level of force in order to overcome the retention force of the actuator.

SUMMARY OF THE INVENTION

The object of the invention is to provide a method and a seat which allow simplified handling for a user, in particular during the calibration phases.

To this end, the invention relates to a control method of the above-mentioned type, wherein the method involves:
  measuring a force applied manually to the movable element by a user;
  controlling the actuator for the movement of the movable element in the direction of the force applied manually to the movable element by the user.

The invention also relates to a seat which is provided with at least two elements which can be moved relative to each other and an actuator for maneuvering a movable element, a unit for controlling the actuator for the movement of the movable element, wherein the seat comprises:
  means for measuring a force applied manually by a user to the movable element,
  the control unit comprises:
    means for calculating the theoretical force which must be applied by the actuator to the movable element in the direction of the force applied manually to the movable element by the user; and
    means for controlling the actuator for the movement of the movable element in accordance with the theoretical force.

According to specific embodiments, the seat comprises one or more of the following features:

the means for measuring the force applied manually by a user to the movable element comprise:
    means for measuring a total force applied to the movable element, and
    means for calculating the force applied manually by a user based on the total force measured and a prior theoretical force applied by the actuator to the movable element;
  the means for calculating the force applied by the user are suitable for correcting the value obtained based on the total force measured and the theoretical force applied by the actuator to the movable element based on a static force specific to the seat for the movable element;
  the seat comprises means for estimating the static force specific to the seat for the movable element by estimating the currents consumed by the actuator during the movement of the movable element in two opposing directions;
  the means for measuring the force applied manually to the movable element by the user comprise means for measuring the current consumed by the actuator;
  the means for calculating the theoretical force are capable of determining the theoretical force as a function of the force applied manually to the movable element by the user; and
  the seat has no keypad for controlling the maneuvering actuator.

The invention will be better understood from a reading of the following description, given purely by way of example and with reference to the drawings.

DESCRIPTION OF PREFERRED EMBODIMENTS

Figure 1:
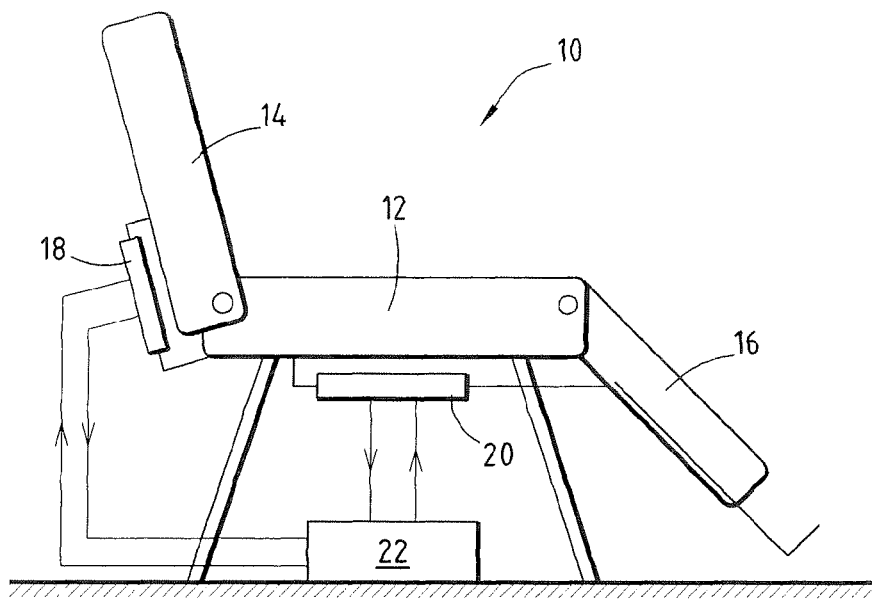
FIG. 1 is a schematic view of a seat according to the invention.
Figure 2:
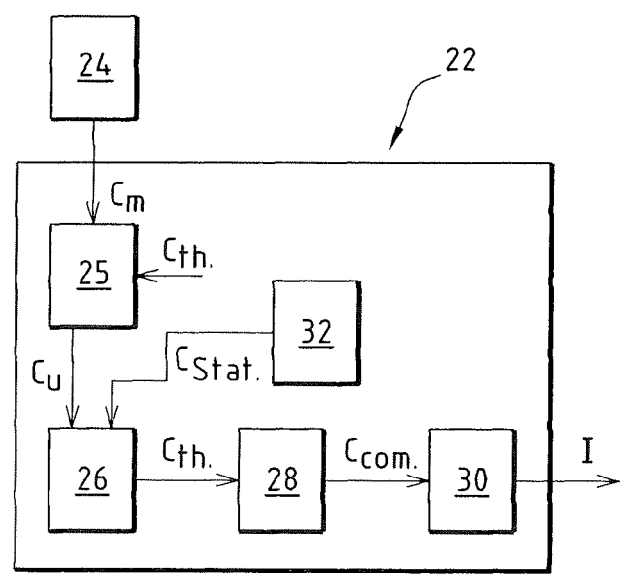
FIG. 2 is a view of the control unit of the seat of FIG. 1, drawn to a larger scale.

FIG. 1 illustrates a seat, and in particular an aircraft seat. This comprises a seat pad 12, to one end of which a backrest 14 is articulated and to the other end of which a leg-rest 16 is articulated. The backrest 14 and the leg-rest 16 are articulated relative to the seat pad and can be moved under the action of an actuator 18, 20, respectively, one end of which is connected to the seat pad and the other end of which is connected to the backrest 14 and the leg-rest 16, respectively.

The actuators 18, 20 each comprise an electric motor which is connected for the power supply thereof to a central control unit 22 of the seat.

This unit 22 comprises means for shaping the current/voltage for supplying the actuator with respect to the movement thereof in one direction or the other.

Furthermore, each actuator is provided with a potentiometer which allows the state thereof and the relative position of the seat elements between which it is arranged to be determined. This potentiometer is connected, for each actuator, to the central control unit 22 to which it is capable of supplying a value which is representative of the position.

According to the invention, each actuator 18, 20 is provided with a means 24 for measuring the force $C_m$ applied to the actuator.

According to a first embodiment, this means 24 is formed by a force sensor which is arranged between the two movable portions of the actuator.

In a variant, the means 24 for measuring the force is preferably constituted by a current sensor which is capable of measuring the current, and/or the derivative of the current relative to time, flowing in the winding of the motor. When there is no power supply, this current is induced by the motor being caused to rotate under the action of the movement of the seat element brought about by the operator.

The central control unit 22 comprises a unit 25 for measuring the force $C_u$ applied manually by the operator to an element of the seat based on the measurement $C_m$ carried out, the prior theoretical force $C_{th}$ normally applied by the actuator and the static force $C_{stat}$, as will be described below.

It further comprises a unit 26 for calculating the theoretical force $C_{th}$ that must be provided by the actuator in accordance with the force $C_u$ calculated to have been applied by the operator. A unit 28 for calculating a reference value $C_{com}$ in accordance with the theoretical force $C_{th}$ calculated is provided in the central control unit 22. It is connected to means 30 for shaping the current/voltage for the control of the actuator in order to obtain the reference force $C_{com}$.

Finally, the central control unit 22 comprises a unit 32 for estimating the static force $C_{stat}$ specific to the seat for the movable element. This unit 32 is capable of implementing a precalibration process in order to determine the static force $C_{stat}$ as will be described with reference to FIG. 4.

Figure 3:
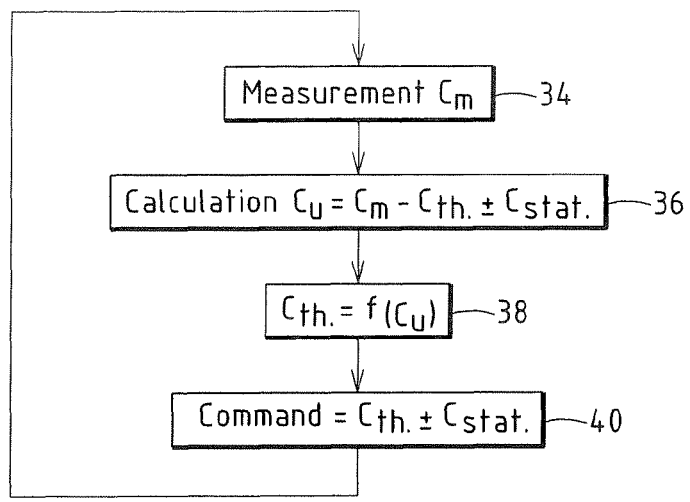
FIG. 3 is a flowchart of the operation of the central unit of the seat during a movement phase of a seat element.

The various units are controlled in order to implement the flow chart illustrated in FIG. 3 when the seat is in calibration mode.

In this manner, at step 34, the force $C_m$ applied to the seat element is measured by the force measuring means 24 provided in the actuator.

At step 36, the unit 25 determines the force $C_u$ applied manually by the operator directly to the seat element. This operator force is equal to the measured force $C_m$ from which is subtracted the prior theoretical force $C_{th}$ which is applied by the actuator and which results from the power supply thereof, and the static force $C_{stat}$ resulting from the occurrences of mechanical friction owing to the assembly of the seat. In this manner, the manual force $C_u$ applied by the operator is given by:

$$C_u = C_m - C_{th} \pm C_{stat}$$

At step 38, a new theoretical force $C_{th}$ which has to be provided by the actuator is determined by the unit 28 in accordance with the manual force $C_u$ applied by the operator in accordance with a predetermined function f. This function is, for example, an affine function.

At step 40, a command $C_{com}$ is determined in accordance with the theoretical force $C_{th}$ previously calculated, to which the static force $C_{stat}$ of the seat is added.

Steps 34 to 40 are repeated continuously as long as the seat is retained in the mode referred to as "calibration mode".

It will be appreciated that, in this operating mode, in the absence of any force applied to the seat element by the operator, the theoretical force is zero, so that the actuator is not supplied with electrical power and the seat element remains immobile.

When the operator applies a force to the seat element, since this force is greater than a predetermined threshold, and in particular greater than the static force $C_{stat}$, this force is determined by the central control unit 22 which calculates a new theoretical force $C_{th}$ which corresponds to step 38 and controls the actuator in accordance with this new calculated theoretical force $C_{th}$.

In this manner, the actuator acts in one direction so that it is involved in the movement of the seat element, preventing the operator from having to provide an excessive level of force in order to move the seat element. As long as a force is applied by the operator, the seat element is moved. When the operator applies a force in the opposite direction, the actuator is first stopped then, if the force is maintained, the actuator moves the seat element in the opposite direction.

It will be appreciated that, with a device of this type, assistance is provided for the operator to move the seat in one direction or the other.

Figure 4:
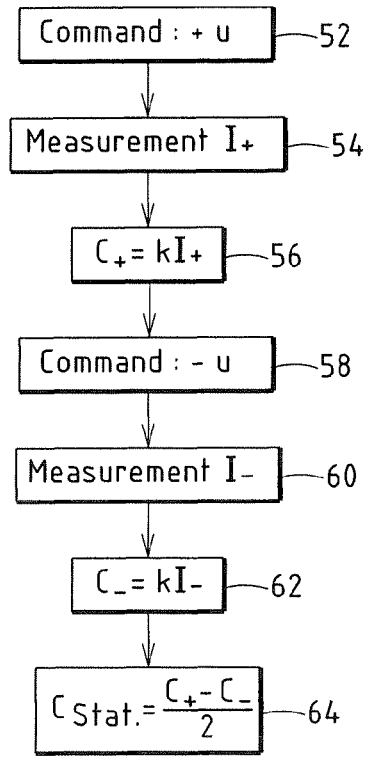
FIG. 4 is a flow chart of the precalibration sequence implemented by the central control unit of the seat.

FIG. 4 illustrates a flow chart of the algorithm implemented in order to determine the static force $C_{stat}$ and to calibrate the central control unit 22. In this manner, when the calibration mode is not yet selected and a precalibration mode is selected, a predetermined reference value +u is applied to the actuator in order to bring about the movement of the seat element in a first direction, at step 52.

At step 54, the current $I_+$ consumed by the motor is measured. A force $C_+$ which corresponds to the movement in the first direction is calculated, at step 56.

In the same manner, at step 58, a command −u opposed to the command applied at step 52 is applied to the actuator. At steps 60 and 62, the current $I_-$ consumed by the motor and the corresponding force $C_-$ provided by the actuator are determined.

Finally, at step 64, the static force $C_{stat}$ is determined as being the mean value of the forces measured in the two movement directions of the seat element, i.e.:

$$C_{stat} = \frac{C_+ - C_-}{2}.$$

According to a production variant, the seat element is unlocked and is released so that it falls under the action of only the mass of the seat element, with the actuator being acted on. The current produced in the motor of the actuator when the seat element falls is measured and the static force is derived.

A control method and a control system of this type may be implemented in a seat which is being used by replacing the keypad which is generally provided on the seat. The seat then has no keypad or the seat comprises a keypad and the actuators may equally well be controlled either from the keypad or from the control system.

In a seat of this type, a passenger who wishes to modify the configuration of the seat applies a force to the element to be moved and the associated actuator moves the element.

The invention claimed is:

1. A method for controlling a seat which is provided with an actuator for maneuvering a movable element of the seat, wherein the method involves:
    measuring a force ($C_u$) applied manually to the movable element by a user; and
    controlling the actuator for the movement of the movable element in accordance with the force ($C_u$) applied manually to the movable element by the user and in the direction of the force ($C_u$) applied manually to the movable element by the user.

2. A seat which is provided with at least two elements which can be moved relative to each other and an actuator for maneuvering a movable element, and a unit for controlling the actuator for the movement of the movable element, wherein the seat comprises:

means for measuring a force ($C_u$) applied manually by a user to the movable element, and the control unit comprises:

means for calculating the theoretical force ($C_{th}$) which must be applied by the actuator to the movable element in the direction of the force ($C_u$) applied manually to the movable element by the user; and means for controlling the actuator for the movement of the movable element in accordance with the theoretical force ($C_{th}$).

3. The seat according to claim 2, wherein the means for measuring the force ($C_u$) applied manually by a user to the movable element comprise:

means for measuring a total force ($C_m$) applied to the movable element, and means for calculating the force ($C_u$) applied manually by a user based on the total force ($C_m$) measured and a prior theoretical force ($C_{th}$) applied by the actuator to the movable element.

4. The seat according to claim 3, wherein the means for calculating the force ($C_u$) applied by the user are suitable for correcting the value obtained based on the total force ($C_m$) measured and the theoretical force ($C_{th}$) applied by the actuator to the movable element based on a static force ($C_{stat}$) specific to the seat for the movable element.

5. The seat according to claim 4, wherein the seat comprises means for estimating the static force ($C_{stat}$) specific to the seat for the movable element by estimating the currents consumed by the actuator during the movement of the movable element in two opposing directions.

6. The seat according to claim 2, wherein the means for measuring the force ($C_u$) applied manually to the movable element by the user comprise means for measuring the current consumed by the actuator.

7. The seat according to claim 3, wherein the means for measuring the force ($C_u$) applied manually to the movable element by the user comprise means for measuring the current consumed by the actuator.

8. The seat according to claim 4, wherein the means for measuring the force ($C_u$) applied manually to the movable element by the user comprise means for measuring the current consumed by the actuator.

9. The seat according to claim 5, wherein the means for measuring the force ($C_u$) applied manually to the movable element by the user comprise means for measuring the current consumed by the actuator.

10. The seat according to claim 2, wherein the means for calculating the theoretical force ($C_{th}$) are capable of determining the theoretical force ($C_{th}$) as a function of the force ($C_u$) applied manually to the movable element by the user.

11. The seat according to claim 3, wherein the means for calculating the theoretical force ($C_{th}$) are capable of determining the theoretical force ($C_{th}$) as a function of the force ($C_u$) applied manually to the movable element by the user.

12. The seat according to claim 4, wherein the means for calculating the theoretical force ($C_{th}$) are capable of determining the theoretical force ($C_{th}$) as a function of the force ($C_u$) applied manually to the movable element by the user.

13. The seat according to claim 5, wherein the means for calculating the theoretical force ($C_{th}$) are capable of determining the theoretical force ($C_{th}$) as a function of the force ($C_u$) applied manually to the movable element by the user.

14. The seat according to claim 6, wherein the means for calculating the theoretical force ($C_{th}$) are capable of determining the theoretical force ($C_{th}$) as a function of the force ($C_u$) applied manually to the movable element by the user.

15. The seat according to claim 2, wherein the seat has no keypad for controlling the maneuvering actuator.

16. The seat according to claim 3, wherein the seat has no keypad for controlling the maneuvering actuator.

17. The seat according to claim 4, wherein the seat has no keypad for controlling the maneuvering actuator.

18. The seat according to claim 5, wherein the seat has no keypad for controlling the maneuvering actuator.

19. The seat according to claim 6, wherein the seat has no keypad for controlling the maneuvering actuator.

20. The seat according to claim 10, wherein the seat has no keypad for controlling the maneuvering actuator.

\* \* \* \* \*